M7843 OR X 7,923
I. Corvell.
Clover Huller.
[redacted]
Patented Dec. 31, 1833.
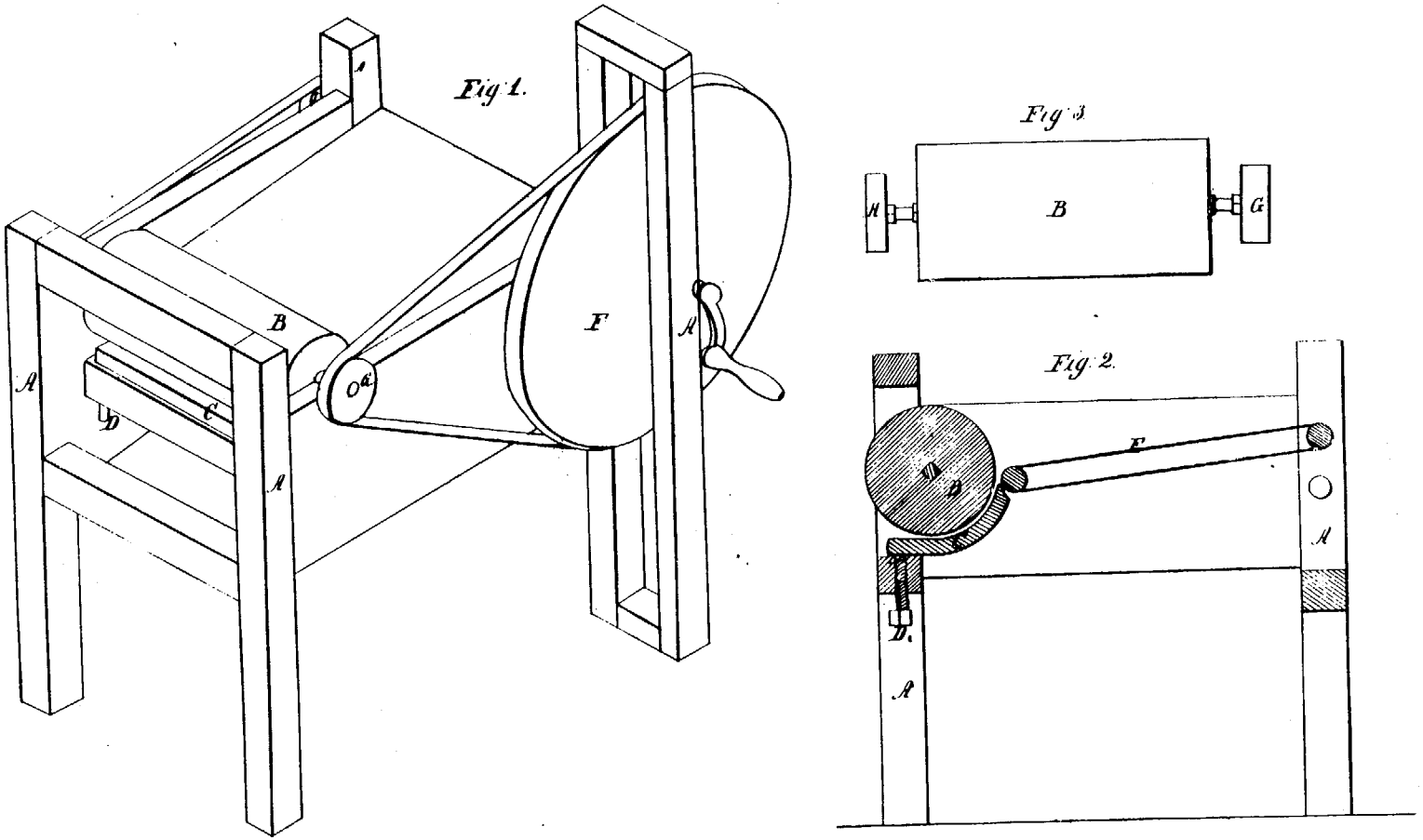
N. PETERS, PHOTO-LITHOGRAPHER, WASHINGTON D. C.

79237 Dec 31, 1833 549

Israel Correll Tuscarawas Co. Ohio

Letters Patent

The Schedule referred to in these Letters Patent and making part of the same Contain-
-ing a description in the words of the said Israel Correll himself of his improvement
in the apron Clover hulling Machine.

Be it known that I Israel Correll of the County of Tuscarawas and State of Ohio
have made and invented a Clover hulling machine which is described as follows
This machine consists of the following principal parts (viz). The frame of this machine
is a square frame of about three feet in length, two feet in width in the clear (the inside)
The end girts are made of square timber of two and two and a half inches square and the
side girts one and a half inch thick and thirteen inches wide and they are framed
into the posts twenty two inches from the bottom of said post. The upper front end girt
mortised into the post just above the side girt the lower front girt mortised into the
post just below the side girt the hind lower girt mortised into the post just below the
side girt the upper hind girt to be mortised through the post eleven inches from the
lower one. one of the hind posts to extend two feet above the side girt and another
of the same length and size to form the carriage for the wheel and a cap across
the top and an other outer tie at the bottom to hold the two posts firm for a wheel that drives
said machine. A Cylinder ten inches diameter shaft running through one inch square
(bar iron) two feet to be left square for the cylinder one inch and a half at each end for the
journals then four inches left square at each end to receive the pulleys which makes
the shaft two feet 11 inches long the Cylinder to be turned perfectly true and covered
well with emery and glue. The Shell or concave to be in a circular form to suit
[illegible] the cylinder and to surround one third or more of said cylinder and to be
well emeryed also the said Shell or concave to be hung at the upper edge by the
screws on the side plates to regulate the concave to said Cylinder Then a cross girt
to fit in the inside of the machine, just below the shell or concave. Then with two
screws running through the said girt to set the lower edge of the concave The
apron to consist of three feet long with a roller at each end to carry the apron to feed
said machine with and a pulley on the back end of the roller. All the above is Drawing

7923X

-pressmen are relied on together with the privilege of carrying the first sheets and material as may be deemed by Jacob Ten all the while adhere to my principle and depart not from it. In testimony whereof I have hereunto set my hand this 27 day of October 1838.

Witnesses
Benjamin Acorn
Nathan Springer

Israel Crosell

[528 w80